April 17, 1928.
A. L. JOHNSTON, JR
1,666,497
ANTISKID CHAIN
Original Filed March 3, 1921
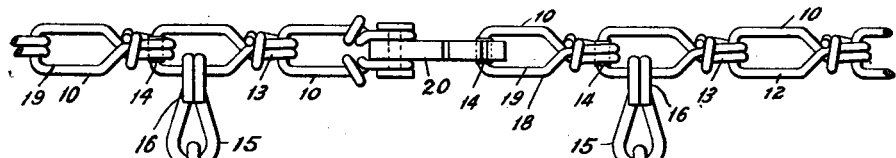
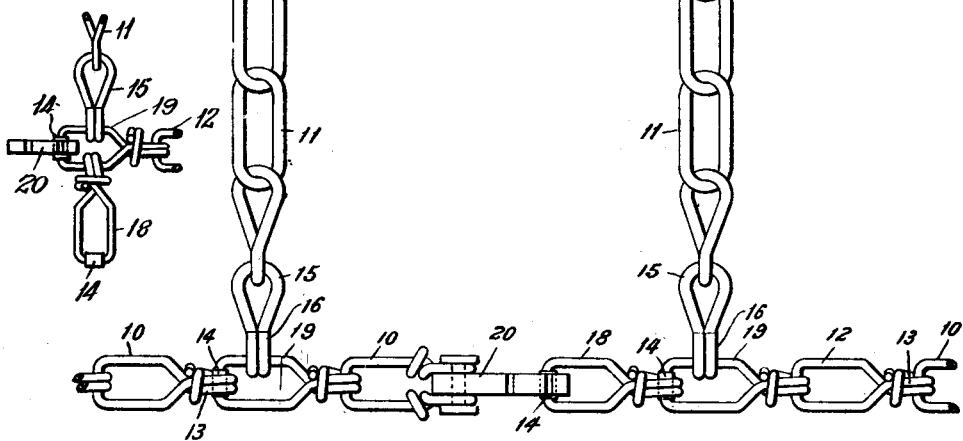
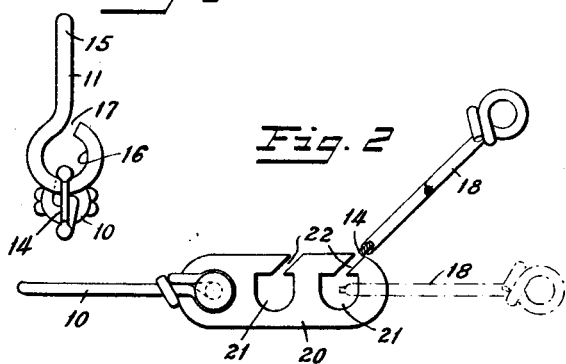
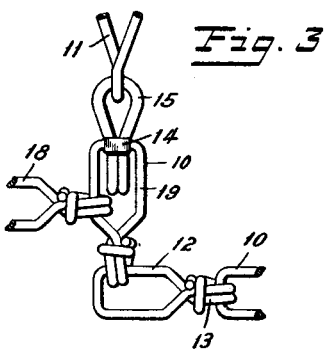
INVENTOR
Andrew Langstaff Johnston Jr.
BY
Duell, Anderson & Duell
ATTORNEYS Patented Apr. 17, 1928.

1,666,497

UNITED STATES PATENT OFFICE.

ANDREW LANGSTAFF JOHNSTON, JR., OF NEWARK, NEW JERSEY, ASSIGNOR TO OFF'N'ON CHAIN CORPORATION, OF NEWARK, NEW JERSEY, A CORPORATION OF DELAWARE.

ANTISKID CHAIN.

Original application filed March 3, 1921, Serial No. 449,490. Divided and this application filed April 25, 1925. Serial No. 25,737.

This invention relates to anti-skid chains for automobile tires or the like, and more particularly to such devices having quick detachable cross chains and improved side chain fastening means.

The subject matter herein disclosed is divided from co-pending application Serial No. 449,490, filed March 3, 1921.

It is a general object of the invention to provide a reliable and efficient anti-skid chain capable of quick and easy application to a tire and designed to give efficient service.

Another object is to provide in anti-skid chains an improved connecting arrangement for facilitating connection or disconnection of the cross chains to the side chains.

Still another object is to provide an improved construction for anti-skid chains wherein certain formations of the side chain links not only cooperate to provide a convenient and satisfactory self-locking attaching device for the side chains, but also cooperate to form an attaching or detaching arrangement for the cross chains whereby the latter may be readily attached or detached without employment of tools.

Other objects will be in part pointed out in the following detailed description and will be in part obvious in connection therewith.

The invention accordingly comprises the features of construction, combinations of elements, and arrangement of parts, which will be exemplified in the constructions hereinafter set forth and the scope of the application of which will be indicated in the claims.

For a more complete understanding of the nature and objects of the invention, reference is had to the accompanying drawing showing an illustrative but preferred embodiment of the invention and in which Figure 1 is a plan view of a portion of an anti-skid chain embodying the invention;

Fig. 2 is an enlarged side view of a form of hook link for the side chain;

Fig. 3 is a fragmentary view showing the method of connecting or disconnecting a cross chain to one of the side chains;

Fig. 4 is an enlarged elevational view showing the construction for connecting or disconnecting a cross chain;

Fig. 5 is a fragmentary plan view showing one of the terminal connecting links of the side chain dropped, the connecting hood link being connected to the second terminal connecting link.

According to the present embodiment of the invention, there are two side chains 10 each including a plurality of concatenated links and being joined by a plurality of cross chains 11. It will be understood that in use the side chains lie against the opposite sides of a vehicle tire or the like extending circumferentially thereof all the way around, while the cross chains pass transversely over the tread of the tire. The side chain links are preferably elongated and may be of any preferred construction but preferably include large, elongated loops 19 with side strands and shorter transverse end strands, the links having eyes 13 smaller than the elongated loops and the planes of the eyes being displaced, on the axis of the link, 90° from the planes of the elongated loops.

The present improvements deal more particularly with the means for connecting the cross chains to the side chains and for connecting the ends of the side chains together when the anti-skid chain is placed in operative position upon a tire. For these purposes certain of the side chain links are formed on the elongated loop thereof with restricted parts of modified cross-sectional dimension, the link strand being preferably of wire circular in cross-section. This modified part is preferably formed by flattening the link strand at the end of the link as indicated at 14, this flattened part being restricted to the end of the link which lies in juxtaposition to the adjacent connected link when said links are in normal extended position as shown in Fig. 1. As many of the side links may be formed with these flattened parts 14 as are desired for connection of the cross chains or for connection of the ends of the side chains.

The cross chains are provided at their ends with connecting end hooks 15 having hook eyes 16 with entrance slots 17 leading thereto. The entrance slots 17 are of a size to permit free passage of the flattened parts 14 of the side chain links, but are restricted to obstruct passage of other parts of the link strand.

From the above disclosure it will be seen that a cross chain may be readily connected to the side chains or disconnected therefrom by a simple manual operation and without employment of tools. Referring to Fig. 3, it will be seen that the connection or disconnection of the cross chain may be readily effected by sliding the adjacent connected link 18 around to one side away from registry with the formation 14 of the link 19 to which a cross chain is to be connected. The entry slots 17 of the end hook 15 may then be brought into registry with the flattened formation 14 and passage of the flattened part through the slot is readily effected. The end hook is then slid around on the link strand to its normal operative position as shown in Fig. 1, and the adjacent connected link 18 may then be again moved into its normal position in alignment with the other links, as shown in Fig. 1. When the side chain links are in substantial alignment with each other as when they are extended in the line of stress of the side chains when applied to a tire, the flattened parts 14 lie in registry with the eyes of the adjacent connected links so as to prevent accidental registry of the connecting formations, thus providing a simple and efficient locking arrangement for preventing accidental disconnection of the cross chains. It will be understood that a desired number of cross chains spaced as desired may be employed, and the side chain links provided with the flattened parts 14 may be distributed to accommodate such spacing.

The flattened ends of formation 14 of the side chain links may also be utilized to cooperate with a side chain connecting hook link, such as hook link 20, to provide a self-locking connection for the ends of the side chains. The hook link 20 is connected to the side chain in any suitable manner, being provided with one or more connecting eyes 21 each having a forwardly inclined entry-slot 22. These entry-slots are of sufficient thickness or depth to permit passage of the flattened part 14 when said part lies substantially in the plane of the slot, but passage is obstructed when the flattened part is disposed obliquely to the plane of the entry-slot, said flattened part being of sufficient width to obstruct such passage. Also, the entry-slots are sufficiently restricted to obstruct passage of the link strand except at the flattened part thereof as described.

It will be seen from the foregoing that the engagement of one of the side links with the hook link 20 to effect connection of the opposing ends of the side chain may be readily effected by inclining the connecting side link to bring the plane of the flattened part 14 into the plane of the inclined entry-slot 22, as indicated in full lines in Fig. 2. When the connecting side chain link and the hook link assume substantial alignment as they do under normal chain tension, as indicated in dot and dash lines, Fig. 2, or in full lines, Fig. 1, accidental disengagement of the connecting link with the hook link will be prevented by reason of the disposition of the flattened part 14 obliquely to the plane of the entry-slot 22, as pointed out above.

It will be observed that any one of the side chain links having the flattened part 14 may be connected with the hook link 20 so that proper tension of the side chains may be readily effected by dropping one or more of the side chain links as shown in Fig. 5.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In an anti-skid chain, in combination, a side chain, means for joining the ends of said side chain including a hook link carried by an end of said side chain, said hook link having a connecting eye and a communicating restricted inclined entry-slot and the opposing link of the opposing end of the side chain having at its end a flattened part of a size and proportions to permit passage through said entrance slot when said opening link lies substantially in the plane of said slot but obstructing such passage when said opposing link assumes substantial alignment with said hook link, a cross chain for said anti-skid chain, and means for connecting said cross chain to said side chain including an end hook at one end of said cross chain having a connecting eye and a restricted entry-slot leading thereto permitting passage of said flattened end part of the side chain link but obstructing passage of other parts thereof, registry of said entry-slot of the cross chain end hook with said flattened end part of said opposing link being obstructed by the engagement between adjacent links when the side chain is extended with the connected links thereof in substantial alignment.

2. In an anti-skid chain, in combination, side chains, a cross chain, means for joining the ends of said side chains including hook links carried by an end of each of said side chains, said hook links and the ends of the opposing links of the opposing ends of the side chains having complementary formations whereby said hook links and the opposing links of the side chains, to secure ends of the side chains together, may interengage in one relative angular relationship thereof while resisting engagement or disengagement thereof in other relative angular relationships, and means for connecting said cross chain to said side chains including end hooks at the ends of said cross chain adapted to cooperate with said complementary formations of the side chain links to permit passage of the latter into said end hooks when the complementary formations on said side chain links are displaced from registry with the adjacent connected links or hook links but obstructing such passage when the side chains are extended in operative position with the connected links thereof in substantial alignment.

3. In an anti-skid tire chain, in combination, side chains including a plurality of concatenated links, certain of said links having at one end thereof restricted portions of modified cross-sectional dimension, cross chains having end hooks provided with connecting eyes and communicating restricted entrance slots proportioned to permit passage of said restricted portions of the links into said connecting eyes, but to obstruct passage at other portions of said side chain links, and connecting hook links for said side chains provided with connecting eyes and communicating inclined entry slots proportioned to permit passage of said restricted portions of the links when said links and hook links are relatively angularly displaced, but obstructing such passage when said links and hook links lie in substantial alignment, the connected links of said side chains or a connected link and hook link thereof, when extended substantially in the line of stress thereof, obstructing registry of said restricted link portions and the said entrance slots of said cross chain end hooks.

4. In an anti-skid chain, in combination, side chains, a cross chain extending between and attached to said side chains, means for joining the ends of one of said side chains including a hook link carried by the side chain, said hook link and an opposing connecting link of the opposing end of the side chain having complementary formations whereby said hook link and said opposing link may be interengaged into connected relationship with each other when in one relative angular relationship thereof and similarly disengaged, disconnection between said hook link and said opposing connecting link being obstructed by said complementary formations when said hook link and said opposing connecting link are extended in operative position in substantial alignment, and means for connecting said cross chain to one of said side chains, including an end hook having a hook seat and a communicating entry-slot proportioned to permit passage of said complementary formation of said opposing connecting link to connect the end hook with the connecting link, said hook link when connected to said opposing connecting link, and extended in operative position in substantial alignment therewith, obstructing disengaging registry of the entry-slot of said cross-chain end hook with the complementary formation of said opposing connecting link.

In testimony whereof I affix my signature.

ANDREW LANGSTAFF JOHNSTON, Jr.